United States Patent [19]

Juhasz

[11] Patent Number: 5,332,254
[45] Date of Patent: Jul. 26, 1994

[54] SKI DEVICE

[76] Inventor: Paul R. Juhasz, Troy Tower No. 410, 380 Mountain Rd., Union City, N.J. 07087

[21] Appl. No.: 30,848

[22] Filed: Mar. 15, 1993

Related U.S. Application Data

[60] Continuation of Ser. No. 950,929, Sep. 24, 1992, Pat. No. 5,213,355, which is a division of Ser. No. 385,729, Jul. 26, 1989, Pat. No. 5,156,413.

[51] Int. Cl.$^5$ ............................................. A63C 5/07
[52] U.S. Cl. ............................................ 280/602
[58] Field of Search ............... 280/601, 602, 607, 609, 280/610

[56] References Cited

U.S. PATENT DOCUMENTS

| | | | |
|---|---|---|---|
| 4,405,149 | 9/1963 | Piegay | 280/602 |
| 4,627,635 | 12/1986 | Koleda | 280/602 |
| 5,033,765 | 7/1991 | Cagneux et al. | 280/602 |

Primary Examiner—Richard M. Camby

[57] ABSTRACT

I have devised a force modulating device, for use as a force modulating member of a ski device, in which I have made a first member thereof to be movably interconnected with a body member of the force modulating device and I have disposed therebetween fluid pressure medium for floating the first member with respect to the body member and controlling the relative movement between such two members. The fluid pressure medium can be a gas, a liquid or a combination gas and liquid. The fluid pressure medium can be provided with a member for communicating with a fluid pressure supply source, illustratively located off of the ski, permitting external manual or automatic adjustments or changes to the fluid pressure to be made after a ski device incorporating this invention has been fabricated so as to optimize the force modulating capability of the ski device for a particular user load and use.

39 Claims, 4 Drawing Sheets

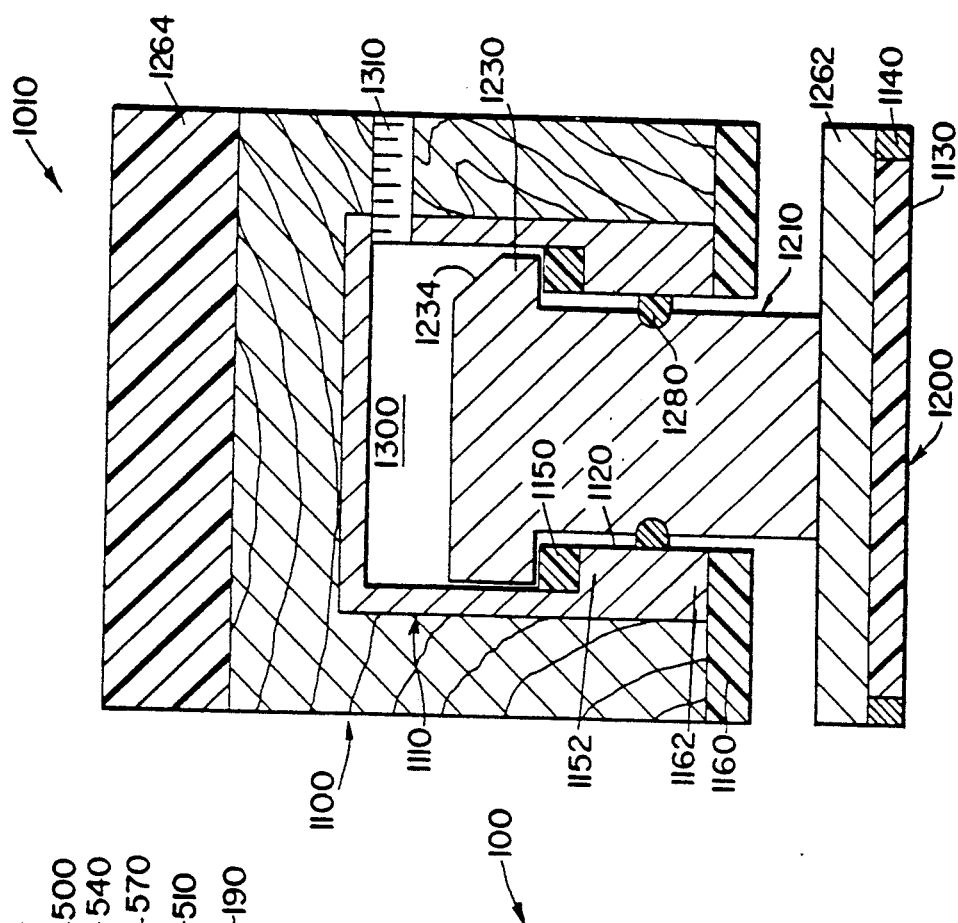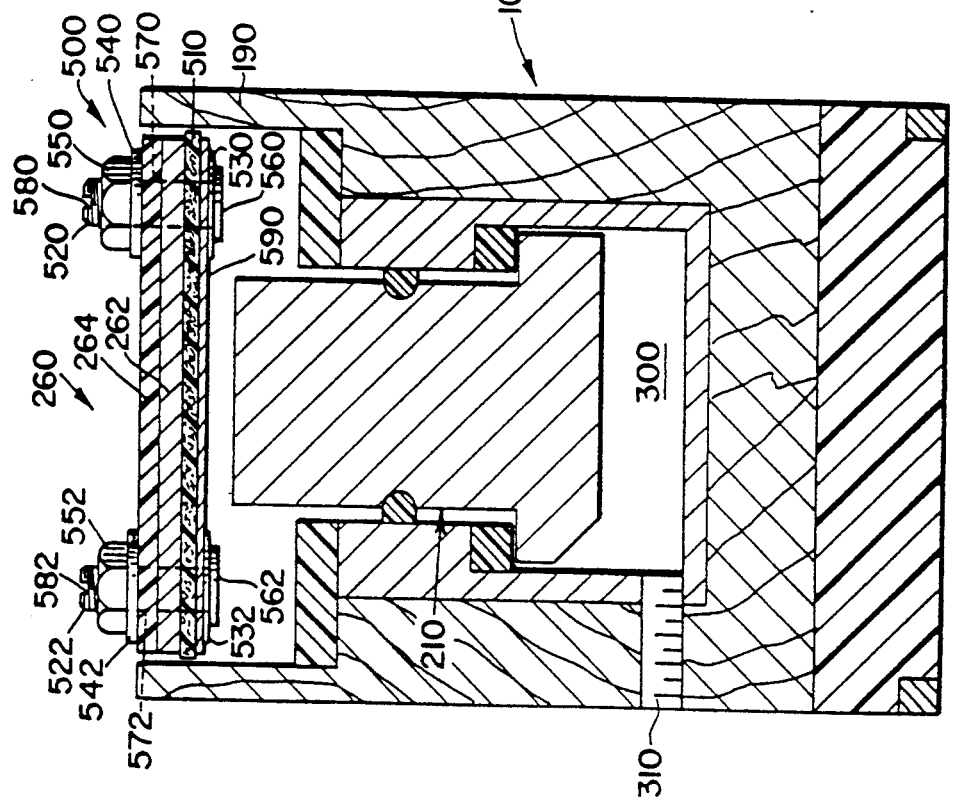

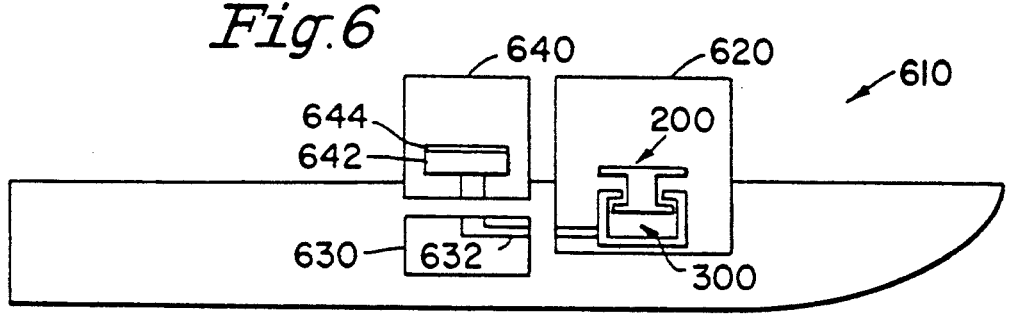
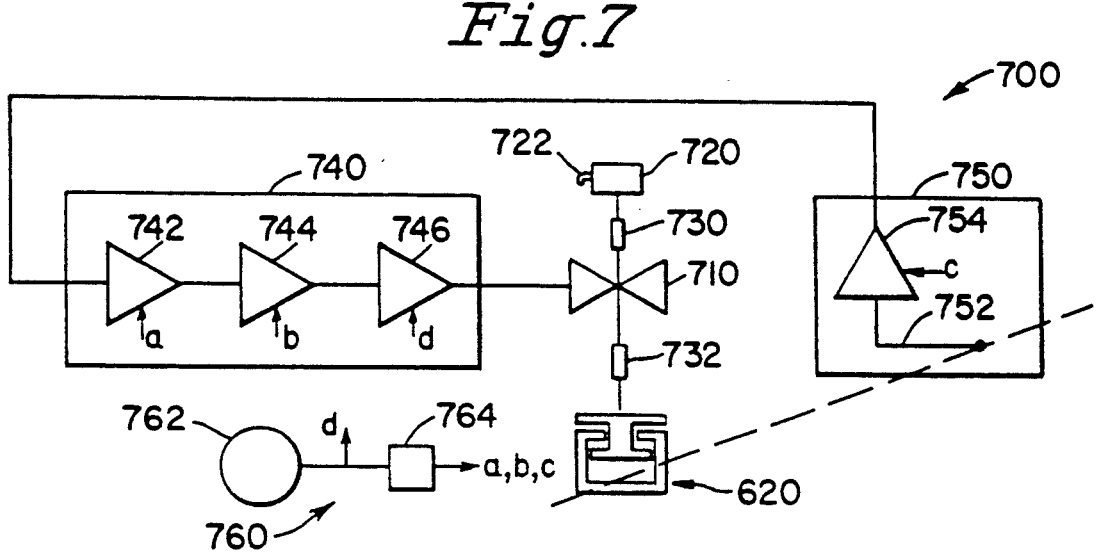
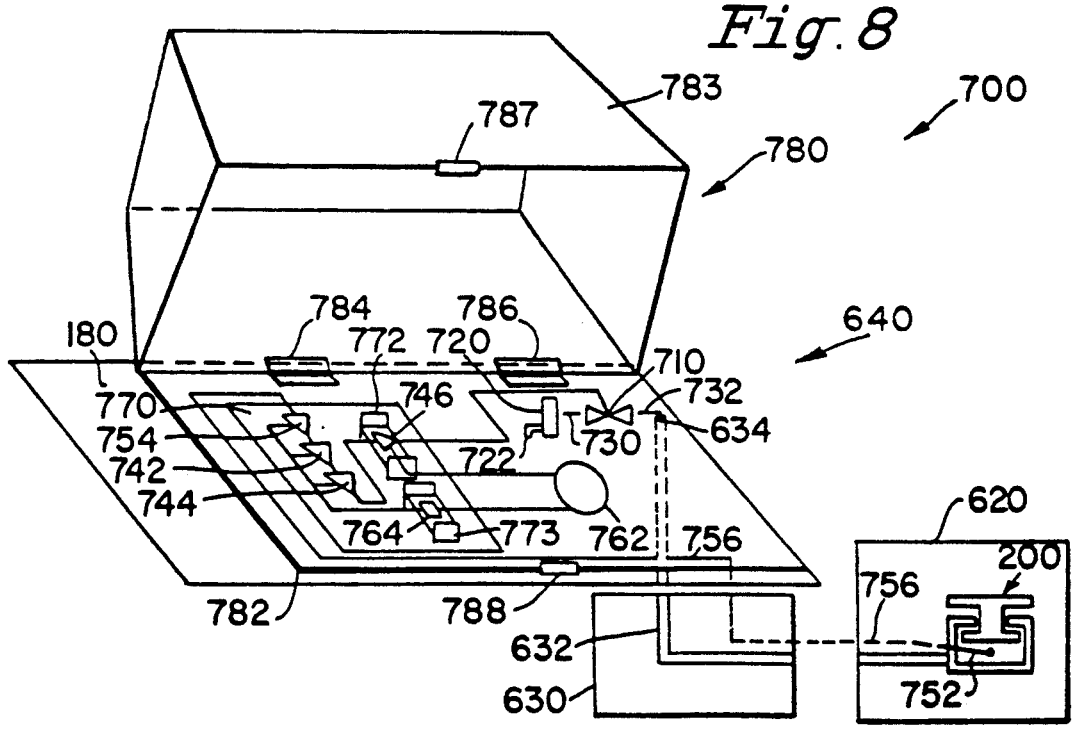

SKI DEVICE

CROSS-REFERENCE TO RELATED APPLICATIONS

This is a continuation of copending application Ser. No. 7/950,929 which was filed on Sep. 24, 1992 and issued as U.S. Pat. No. 5,213,355 on May 25, 1993, which is a division of U.S. patent application Ser. No. 7/385,729, which was filed on Jul. 26, 1989 and issued as U.S. Pat. No. 5,156,413 on Oct. 20, 1992.

BACKGROUND OF THE INVENTION

This invention relates generally to ski devices and particularly to ski devices that are adapted to modulating the impact forces to which they are exposed.

Materials are commonly added to ski devices for the purpose of altering the impact forces to which such devices are exposed. See, for example, U.S. Pat. No. 3,861,699 (fiber reinforced plastic honeycomb core having hollow tubular members and upper and lower foam filled corrugations); U.S. Pat. No. 4,065,150 (ski body composed of a composite material of continuous reinforcing fibers embedded in a matrix of an elastomer modified plastic foam); U.S. Pat. No. 4,405,149 (ski provided internally with two or more strips of constrained viscoelastic material); U.S. Pat. No. 4,420,523 (rigid core with a number of elastomer strips reinforced with twisted fiber bundles); U.S. Pat. No. 4,438,946 (ski body provided with a stressed viscoelastic band); U.S. Pat. No. 4,563,020 (metal disk on low friction collar shifts between a pair of foam rings in a housing attached to the tip of the ski); U.S. Pat. No. 4,627,635 (damping unit of ski has viscoelastic means interposed between alternating one-end-free, one-end-secured flexible strips); U.S. Pat. No. 4,647,063 (cellular core structure). These devices have generally been found to be limited in their ability in altering such forces. They are also limited in the adjustments that can be made to their impact force altering charactistics once the ski device has been fabricated so as to make the device readily adaptable for a particular user load and use.

SUMMARY OF THE INVENTION

One object of the present invention is to provide a ski device with good means for modulating the impact forces to which the ski is exposed.

Another object of the present invention is to provide a ski device with impact modulating means that can, after fabrication of the device, by external manual or automatic adjustment, be readily tuned in its impact modulating characteristics so as to make the ski device adaptable for a particular user load and use.

Another object of the present invention is to provide an extremely effective means for isolating the skier and/or portions of the ski device from the severity of impact forces to which the ski is exposed.

Another object of the present invention is to provide a ski device with means for so modulating impact forces transmitted to the ski as to allow for good ski performance in terms of spring-action, smooth ride, handling and service life.

To achieve these and other objects, I have devised for use as a force modulating member of a ski a force modulating device in which I have made a movable member thereof to be movably interconnected with a body member of the force modulating device and I have disposed therebetween fluid pressure means for floating the movable member with respect to the body member and controlling the relative movement between such two members. The controlled movement of the movable member relative to the body member provided by the fluid pressure means causes impact forces transmitted to a ski device incorporating the present invention to be so modulated as to allow for good ski performance in terms of spring-action, smooth ride, handling, and service life.

Illustratively, the force modulating device can be so incorporated into the ski device that its movable member provides a top or bottom surface to the ski device. Alternatively, the entire force modulating device can be incorporated within the ski. Incorporating more than one such device of like or different fluid pressure means can further tailor the dynamic response of the ski to impact forces.

The fluid pressure means can be provided with means for communicating with a fluid pressure supply source, illustratively located off of the ski. Such communication means readily permit manual or automatic pressure adjustments or fluid pressure medium changes to be made to the fluid pressure means, after a ski device incorporating this invention has been fabricated, so as to better tailor the force modulating capability of the ski device to a particular user load and use.

The force modulating device of the present invention can be altered in its force modulating characteristics by a manually adjustable vibration damping assembly disposed between the movable and body members of the device. Mechanical and electrical control means can be adapted to the ski device incorporating this invention so as to cooperate with the fluid pressure means of the force modulating device in controlling the relative movement between the movable and body members of the force modulating device.

BRIEF DESCRIPTION OF DRAWINGS

These and other objects, features, and advantages of the invention will be more readily apparent from the following description of the illustrative embodiments of the invention in which:

FIG. 3 is an exaggerated side view taken through a center section of one illustrative fabrication embodiment of the ski device of the present invention.

FIG. 4 is an exaggerated top view of the FIG. 3 ski device.

FIG. 5 is an exaggerated cross-sectional view similar to a cross sectional view of the FIG. 1 device taken along either phantom line 5—5 illustrating another embodiment of the invention.

FIG. 6 is a schematic side view of another illustrative embodiment of the ski device of the present invention.

FIG. 7 is a schematic diagram, partly in functional block diagram form, of an electronic control system with transducer feedback adapted for use with the FIG. 6 ski device.

FIG. 8 is a schematic perspective layout, partly in block diagram form, of the FIG. 6 ski device with FIG. 7 electronic control system.

FIG. 9 is an exaggerated cross-sectional view of yet another illustrative embodiment of the ski device of the present invention.

DETAILED DESCRIPTION OF THE INVENTION

Figure 1:
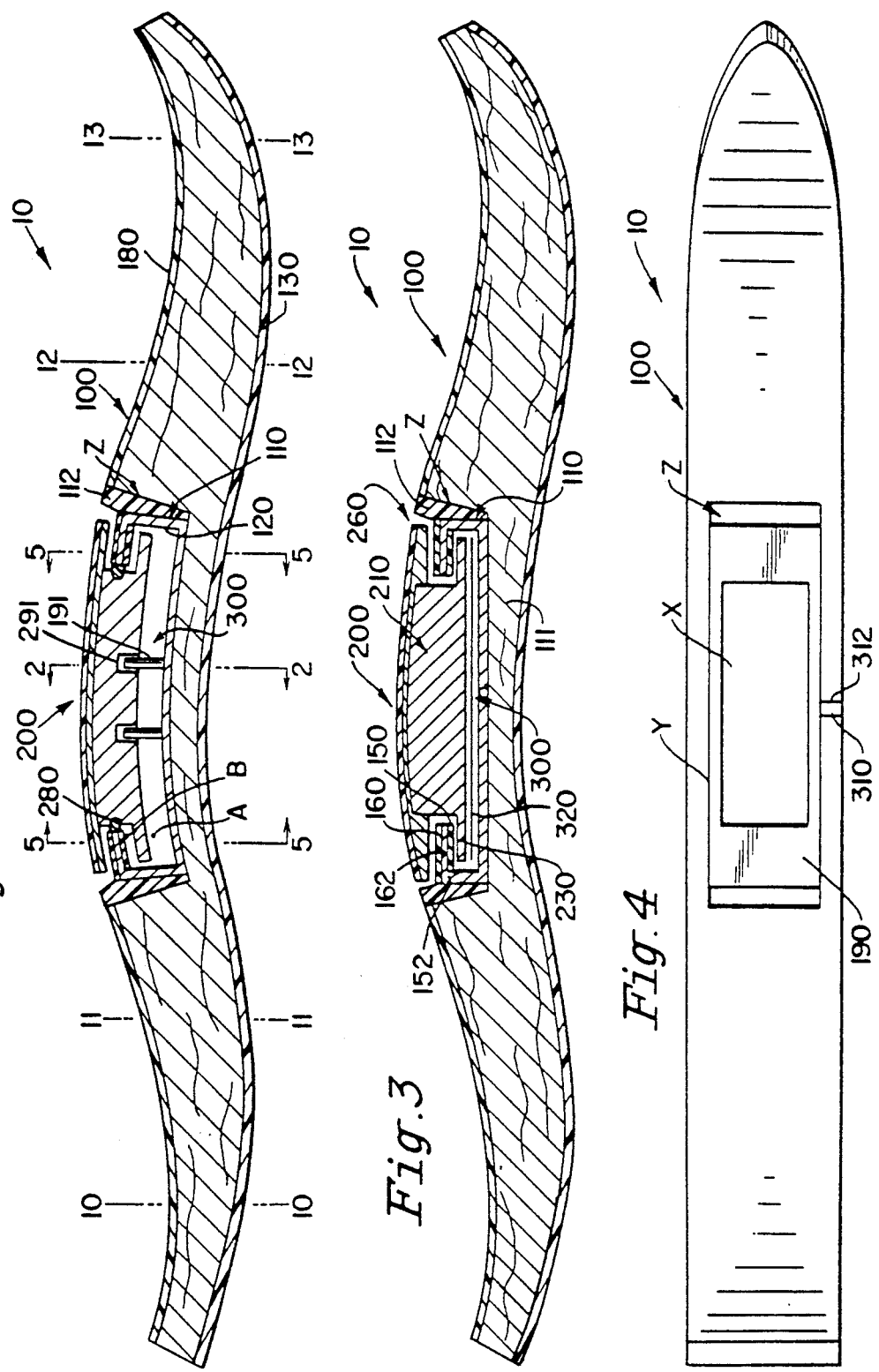
FIG. 1 is an exaggerated side view taken through a center section of one illustrative embodiment of the ski device of the present invention.

FIG. 1 shows a ski device 10 of the present invention comprising a bottom member 100, a top member 200, and a pressure chamber 300.

Bottom member 100 defines in a portion thereof a housing 110 forming a bore 120 on an inside surface.

Housing 110 receives the top member 200, as hereinafter described, which cooperates with the wall of bore 120 to define the pressure chamber 300, also hereinafter described.

Fluid pressure medium from a fluid pressure supply source (not shown), illustratively located off of the ski, is communicated to pressure chamber 300 via an inlet port 310 (not shown), prior to skiing such that top member 200 moves from point A toward point B within bore 120 of housing 110.

Impact forces applied to ski device 10 urge top member 200 toward or away from bottom member 100. Consequently, pressure chamber 300 is varied by this relative movement of top member 200 and bottom member 100 causing the impact forces to be so modulated as to allow for good ski performance in terms of spring-action, smooth ride, handling, and service life.

In accordance with the invention, bottom member 100 comprises oak, okoume, fir, spruce or other woods; rigid foam in acrylic, polyurethane, epoxy, rigid p.v.c. and other resins; hollow cores in fibre-reinforced-resin box-structure; honeycombed material such as aluminum; metal; or other ski construction materials (hereinafter, collectively, "Ski Construction Materials") configured so as to withstand the forces the bottom member must bear during use. These materials can be used alone or in varying permutations and combinations so as to provide a desired stiffness to the ski device. The housing 110 portion of the bottom member too is made from Ski Construction Materials, selected, in addition to the stiffness criteria, so as to contain the fluid pressure medium in the pressure chamber as hereinafter described and preferably also so as to accommodate the compressive stresses and strains experienced in various portions of the ski device along the thickness of the ski device. If a stiff material, such as a non-yielding metal is used for housing 110, a gap Z can be provided in the bottom member 100 for accommodating the above compressive stresses and strains. In this case, a resilient backing 112, such as shown in FIG. 1, can be placed in the gap to provide a continuous surface so as to enhance the structural strength and aerodynamic performance of the ski while accommodating the aforementioned compressive stresses and strains.

Figure 2:
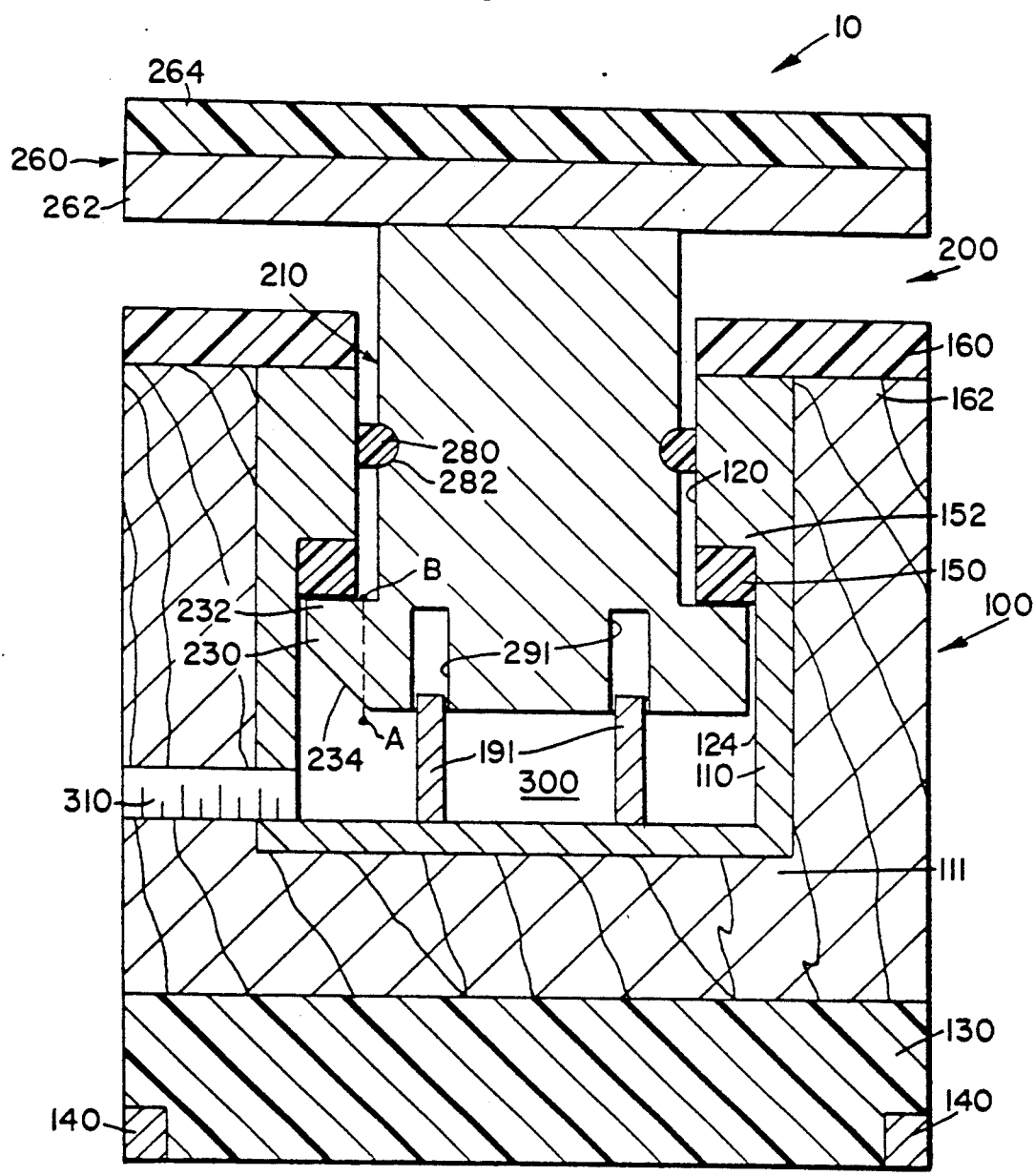
FIG. 2 is an exaggerated cross-sectional view of the FIG. 1 ski device taken along phantom line 2—2.

As shown in FIG. 2, bottom member 100 further comprises a low friction running surface 130, edges 140, and rubber gaskets 150, 160. Illustratively, low friction running surface 130 is an extruded sheet of polyethylene material, typically secured to a surface 111 below housing portion 110. Alternatively, one or more layers of Ski Construction Materials can be disposed and adhesively secured between running surface 130 and surface 111. These materials can be used alone or in varying combinations so as to provide a desired stiffness to the ski device. Edges 140 are preferably steel strips secured to the bottom edges of low friction running surface 130. Rubber gasket 150 and rubber gasket 160 are fixedly seated along an inside shoulder 152 and an outside shoulder region 162, respectively, of housing 110 so as to absorb vibrations created whenever top member 200 comes into contact with said inside and outside shoulders.

Top member 200 comprises a core assembly 210 slidably disposed within bore 120 and a top layer 260 engageable with core assembly 210.

Top layer 260 comprises a solid substrate 262 and a protective cosmetic layer 264. Illustratively, solid substrate 262 comprises a metal. Alternatively, solid substrate comprises one or more other layers of Ski Construction Materials configured so as to withstand the forces the top layer must bear during use. These materials can be used alone or in varying permutations and combinations so as to provide a desired stiffness to the ski. Illustratively, protective cosmetic layer 264 is a sheet of plastic.

Core assembly 210 comprises one or more core layers of Ski Construction Materials, which can be used alone or in varying permutations and combinations so as, in addition to providing a desired stiffness to the ski, to contain fluid pressure medium in the pressure chamber as hereinafter described. Core assembly 210 extends substantially across the opening of bore 120 so as to be movable within the bore and extends into the bore.

Core assembly 210 terminates away from top layer 260 in a sidewardly extending flange 230. The flange sidewardly extends into an outwardly stepped portion 124 of bore 120 formed about a lower section of bore 120 for the purpose of movably receiving sidewardly extending flange 230. The flange is dimensioned so as to be moveable from Point A to Point B within said outwardly stepped portion 124 of bore 120. A top side 232 of flange 230 is shaped so as to engage rubber gasket 150, which is adhesively seated against inside shoulder 152 of the housing 110, when top side 232 of flange 230 is situated at Point B therein. Shoulder 152 substantially prevents core assembly 210 from moving upwardly of Point B and thus acts to retain the core assembly 210 within bore 120. A bottom side 234 of flange 230 near inlet port 310 to pressure chamber 300 is tapered inwardly so as to allow fluid pressure medium from a fluid pressure supply source to freely communicate with pressure chamber 300 when core assembly 210 is seated near bottom portion of housing 110.

Pressure chamber 300 has one end connected to inlet port 310. Alternatively, pressure chamber 300 can be designed to operate without such inlet port 310. Illustratively, the inlet port is a pressure valve. The inlet port is shown in FIG. 2 to be open at a first end to pressure chamber 300 and at a second end to an outside surface of ski device 10, preferably a side terminating away from the other of the two ski devices being used, so as to be adaptable for connection to a fluid pressure supply source (not shown), which illustratively is located off of the ski. Inlet port 310 readily permits manual or automatic pressure adjustments or other changes to be made to the fluid pressure means, including charging or changing of the fluid pressure medium, after the device has been fabricated so as to better tailor the force modulating capabilities of the ski device for a particular user load and use.

Preferably, structural enhancement means are provided to the ski device for the purpose of resisting the core assembly from rolling, pitching, or yawing within the pressure chamber during turning motions of the ski. One example of such a resistance means is providing pressure chamber 300 with one or more vertical guide posts 191 extending upwardly from bottom portion of housing 110 into pressure chamber 300 for slidably mating with openings 291 provided in the core assembly 210. The guide posts so serve as a core assembly guide within bore 120 in the housing as to provide resistance to rolling, pitching, or yawing of the core assembly within the pressure chamber.

Pressure chamber 300 is charged with a fluid pressure medium to a predetermined pressure so as to upwardly bias top member 200 and urge sidewardly extending flange 230 toward rubber gasket 150 and inside shoulder 152 of housing 110. Illustratively, the fluid pressure medium is compressed air. Alternatively, any gas or liquid at the temperature ranges that the ski is to be used with compressibility characteristics can be used. An example of another gas is nitrogen. Examples of some liquids that can be used as the fluid pressure medium include water (above freezing point, alone or in combination with solutes, but below freezing, in combination with solutes such as alcohol, glycerol, ethylene glycol), mineral oils, emulsions, water-based glycols, or synthetic fluids such as phosphate esters or chlorinated hydraulics.

Preferably, pressure chamber 300 is provided with a fluid bag or other fluid containment means (not shown) which extends inside and along the pressure chamber for receiving the fluid pressure medium contained by the pressure chamber. If pressure chamber is designed to operate with inlet port 310, the first end of the inlet port is molded integral with such fluid containment means. Alternatively, the fluid pressure medium is received and contained by the walls of pressure chamber 300 and a resilient sealing member 280 illustratively comprising a U-shaped, lip-type pressurized fluid tight seal which cooperates with the wall of bore 120 so as to substantially form pressure chamber 300. In this alternative and as shown in FIG. 2, resilient sealing member 280 is fitted into a slot 282 formed in a wall of core assembly 210 which urges it against the wall of bore 120 so as to seal pressure chamber 300 and at the same time serve as a top member 200 guide within bore 120 in housing 110. The U-shaped lip portion of the resilient sealing member 280 allows fluid pressure medium to press the resilient sealing member against the wear surfaces. Alternatively, resilient sealing member can be fitted into a slot formed in the bore 120 side of housing 110 and urged against core assembly 210. Resilient sealing member 280 is selected to be compatible with the pressurized fluid medium housed by pressure chamber 300 and to seal the fluid pressure medium in the pressure chamber under the operating parameters of the pressure chamber. It will be appreciated that as yet another alternative, cooperation of the fluid bag and resilient sealing member 280 can contain the fluid pressure medium within pressure chamber 300.

The fluid bag is chosen for its compatibility with the fluid pressure medium which it will contain under the conditions at which such fluid pressure medium in the pressure chamber will be charged. Preferably, the fluid bag is pear shaped or similarly tapered on the portion of the fluid bag adjacent to top member 200 so that in pressure chamber 300, the movement of top member 200 within bore 120 provides optimum pressure distribution without degrading the sidewalls of the fluid bag. Illustratively, the fluid bag is made of elastomeric material such as nitrile rubber. Alternatively, any other fluid bag meeting the compatibility and operability conditions set forth above can be used.

Illustratively, and as shown in FIG. 1, top member 200 extends lengthwise along a middle portion of ski device 10 between front and tail end portions of the ski. Such middle portion includes the portion of the ski device occupied by boot and binding of a skier. Alternatively, top member 200 can extend lengthwise along any portion of ski device 10. It will also be appreciated that as hereinafter described more than one top member 200 - housing 110 - pressure chamber 300 - combination can be used with the present invention. For example, a top member of a first combination can be located between phantom lines 10—10 and 11—11 of FIG. 1 so that top surface of the top member is in contact with the snow and a top member of a second combination can be located between phantom lines 12—12 and line 13—13 so that top surface of the top member is similarly in contact with the snow. In this example, alternatively, the top surfaces can face upward. Appropriate weighting of the top and bottom members produces the desired impact response. As will be appreciated, each of these and other top member configurations can be used alone or in varying combinations to provide ski device 10 with a desired response to impact forces.

Referring to FIG. 2 in combination with FIG. 1, top layer 260 of top member 200 extends widthwise substantially across the width of ski device 10. Alternatively, top layer 260 can at the portion of ski device 10 occupied by boots and bindings of a skier extend substantially across the width of the ski device and beyond such points extend across any width of the ski device as is desirable for a particular ski application. Core assembly 210 of top member 200 extends between and into bore 120 of bottom member 100.

In this illustration, the top portions of ski device 10 that are not included as part of top member 200 (i.e., the top portions of the tip and tail portion of the ski device) are understood to be part of bottom member 100. For example, protective cosmetic layer 180 of bottom member, which is analogous in function and make-up to protective cosmetic layer 264 of the top member is fabricated as part of the bottom member.

Illustratively, in a 195 cm length ski device having about a 70 mm width, starting at about 840 mm from the tip of the ski device is defined housing 110 forming bore 120 having an outer opening of slightly greater than about 482.6 mm in length, 47.63 mm in width, 2.38 mm in depth for about a 22,986 square mm opening and an outwardly stepped portion 124 of bore 120 of slightly greater than about 604.8 mm in length, 52.39 mm in width, 4.76 mm in depth for about a 31,684 square mm opening. About 0.79 mm thick rubber gaskets 150, 160 are adhesively seated on either side of the outer opening. Slidably disposed within the bore is a core assembly 210 of about 7.14 mm in depth including a flange 230 portion depth of about 1.59 mm, the flange extensions away from the core assembly being, toward the tip and tail section of the ski, about half of 122.23 mm each, and toward the sides of the ski, about half of 4.76 mm each. The stroke length of the core assembly in the bore, that is, the extension of core assembly 210 into the bore, is about 6.35 mm at maximum and 4.76 mm at minimum extension. Top layer 260, a metal, of top member 200 extending about 609.6 mm in length starting at about 840 mm from the tip of the ski device has about a 70 mm width and is several mm in depth. A gap formed between top layer 260 and rubber gasket 160 is about 1.59 mm when the core assembly is at minimum extension into the bore. The gap formed between Points A and B is about 1.59 mm. The volume of the pressure chamber varies with minimum and maximum extension of the core assembly into the bore between about 75,453 cubic mm and 25,158 cubic mm, respectively. Compressed air is introduced into pressure chamber 300 so that the air is under a pressure of about 20 psi.

Illustratively, ski device 10 is fabricated as shown in FIGS. 3,4 using the well-known laminated or bonded cross-section process. Alternatively, the device can be formed using wet wrap or torsion cell or other processes or combinations of processes. Illustratively, housing 110 portion of bottom member 100 is formed from steel. Other suitable materials can be chosen so long as appropriately dimensioned to receive, hold and be compatible with the fluid pressure medium which it will contain under the conditions at which such fluid pressure medium in the pressure chamber will be charged. In the above illustrated ski device, housing 110 has a ceiling, a floor and walls welded together from a top panel 190, a bottom panel, and side and tip and tail panels, respectively, of greater than about 2.38 mm thickness each. A taphole 312 is formed in a first side panel of the housing for accommodating inlet port 310.

Prior to welding of the housing, a window X is opened in top panel 190 of the housing 110, dimensioned to have the area of the bore. The thickness of this top panel defines the depth of the outer opening of bore 120 for receiving core assembly 210. The side panels of window X are polished to promote movement of core assembly 210 (the contact surfaces of which are also polished) thereagainst. Rubber gasket 150 is adhesively seated against the inner side of the top panel, i.e., inside shoulder 152 side of housing 110. Rubber gasket 160 is adhesively seated against the outer side of the top panel, i.e., outside shoulder 162 side of housing 110. With core assembly 210 disposed partly through window X, top layer 260 is adhesively secured to the core assembly. In this way, top member 200 is built into the top panel of the housing. A fluid bag 320 is secured to the inner side of the bottom panel of the housing so that its valve (i.e., inlet port 310) fits through taphole 312 in a first side panel of housing 110. With side panels of the housing in place, the edges of the housing panels are then welded together.

Bottom member 100 of the ski device is formed using laminated techniques and is provided with a window Y for receiving and holding the housing. As shown in FIG. 4, at the tip and tail sides of window Y are provided window extensions Z which are tapered outwardly (as shown in FIG. 3) so as to form a gap of about 15 mm at the opening and about half that amount at the base of the gap when the housing is put into window Y. Such gap, which receives resilient backing 112, allows for accommodation of the compressive stresses and strains experienced along the thickness of the bottom member 110 when the camber of the bottom member is downloaded.

The ski device is finally assembled in a suitable mold in the following manner. Bottom member 110 of the ski device is positioned in the mold. The bottom and side surfaces of the housing, the resilient backing 112, the contact surface of the rubber gasket 160 extending outwardly from the top panel, and window Y, with Z extension, are coated with a suitable adhesive and the housing and the resilient backing are placed into the window. When all parts of the ski are prepared and positioned, the mold is closed. The assembly is subjected to suitable heat and pressure until the parts of the ski device are securely bonded to each other. The ski is then put through a finishing process.

Prior to use, pressure chamber 300 is charged with air, illustratively to about 20 psi so as to upwardly bias core assembly 210 within ski device 10. (If the invention is used without an inlet port, the pressure chamber is charged to this pressure during the manufacture of the device at the factory.) As pressure chamber 300 is charged, core assembly 210 is urged upwardly within ski device 10 from Point A toward Point B. A second biasing pressure within pressure chamber 300 is defined when ski device 10 is downloaded with the weight of the skier.

During skiing, when ski device 10 hits a disturbance such as a bump, bottom member 100 rises rapidly. Without this invention, the impact force transmitted to the skier generally would be considerable. In this invention, generally, the only force transmitted to the skier is that required to compress pressure chamber 300 far enough for bottom member 100 to ride over the bump. This force causes the skier to accelerate upwards but generally at a much smaller rate than would otherwise be experienced.

When bottom member goes into depression, the force in pressure chamber 300, acting on the relatively light unsprung mass of bottom member 100 forces the bottom member downwardly at a rapid rate so that it generally reaches the base of the depression almost before the relatively much larger mass of the skier has, owing to his inertia, had time to begin to descend. Since the variations in the pressure chamber 300 force over such deflections are relatively small, the downward acceleration of the skier supported by the pressure chamber generally is correspondingly moderate as compared with that which, under the influence of gravity, it would be if there were no pressure chamber.

When the disturbance has passed, whether it is a bump or a depression, the subsequent motion of the skier generally as his free vibration on the pressure chamber, the acceleration being small. As shown in FIG. 5, by providing a vibration damping assembly 500 to top member 200, this vibration can be rapidly reduced to zero.

FIG. 5 shows a variation on the FIG. 2 device wherein around phantom line 5—5 and phantom line 5—5 of the FIG. 1 ski device (i.e., the portion of the ski device outside the area occupied by the boot and binding), the width of top member 200 is narrower than the width of the ski device and wherein further bottom member 100 extends upwardly alongside such top member portions of narrower width to form sidewalls 190 thereto. As shown in FIG. 5, top layer 260 of top member 200 further comprises, illustratively at such top member portions of narrower width, a soft block 510 secured to solid substrate 262 of top layer 260, threaded bolts 520,522, with heads 560,562, first washers 530, 532, second washers 540,542, nuts 550,552, and a plate member 590. Soft block 510 is made from damping material, illustratively, comprising an elastic natural rubber impregnated with asbestos fibers for friction and heat resistance, friction modifiers, such as oils to give the desired friction coefficient, and powdered metal to improve friction performance. Soft block is disposed between solid substrate 262 and plate member 590, illustratively metal. Openings 570,572 are formed in top layer 260 for accommodating threaded bolts 520,522 such that top ends of the bolts extend out of top layer 260. First washers 530,532 are placed between the heads 560,562 and plate member 590. Top ends of bolts are provided with second washers 540,542 held in place by nuts 550,552. The top ends of bolts are provided with screwdriver slots 580,582 which are used for adjustment purposes. Alternatively, nuts 550,552 can be directly adjusted with a suitable wrench. Adjustment of bolts 520,522 cause a variation in the axial compression of soft block 510 between solid substrate 262 and plate member 590. As the axial compression increases, the soft block is urged against sidewalls 190, causing an increased amount of friction between the soft block 510 and the surface of sidewalls 190. Several bolt arrangements can be used with soft block 510 so as to enhance the adjustment capability of the vibration damping assembly 500.

As discussed in connection with FIG. 2, pressure chamber 300 of the ski device can be charged with a liquid fluid pressure medium. Because liquids are only slightly compressible, the result would be a relatively stiff or hard ski. The effective stiffness of the liquid system can be adjusted to a suitable value by making some part of the system more elastic. (Alternatively, a gaseous system can be adjusted to a suitable value by making some part of the system stiffer.) One illustrative system for doing this is to provide the device of FIG. 2 with both liquid and gas fluid. In that system, a liquid fluid pressure medium is provided along the bottom portion of housing 110 and a gaseous fluid pressure medium is disposed between the liquid fluid pressure medium and top member 200. Preferably, either or both the liquid fluid pressure medium and the gaseous fluid pressure medium are contained by a fluid bag although no container means or other container means such as a diaphragm may be employed to separate and contain the liquid and gaseous fluid pressure media. The fluid bags are chosen for compatibility with the fluid pressure medium they are to contain, normally nitrile rubber for general use. As one example is a FIG. 2 device, operated with about 33% of the pressure chamber being occupied by oil contained in a fluid bag and the remainder of the fluid pressure chamber being charged with air (contained by a fluid bag) to about 18 psi.

Changing the physical parameters of the fluid pressure means—volume, for example—is yet another method for adjusting the stiffness of either a liquid or a gas based fluid pressure medium. For example, a fluid pressure medium charged system of FIG. 2 can be provided with means for changing the response characteristics of the fluid pressure medium in the system to impact forces. FIG. 6 shows in schematic form, one such "fluid softening system" 610 comprising the force modulating device of FIG. 2, shown here in functional block 620, and functional blocks 630 and 640 as hereinafter described.

In a first such "fluid softening" system 610, functional block 620, which contains the fluid system of FIG. 2, charged here with liquid fluid pressure medium (although it will be appreciated that such a system 610 can be adapted to lend itself to charging with a gaseous fluid pressure medium), has connected thereto one channel member 632 (although it will be appreciated that more than one channel member can be used with this system) shown here in functional block 630 which in turn is connected to a reservoir 642 shown here in functional block 640. The channel member, having about a 2.38 mm diameter, is connected to a lower portion of the reservoir, illustratively rectangular in volume, having about a 645 square mm area opening and a depth of about 4.76 mm. The reservoir opens along the upper surface of the ski device with the opening being enclosed by an elastic diaphragm 644. Pressure chamber 300 of the FIG. 2 fluid system of functional block 620, channel member 632 and reservoir 642 are charged with a liquid fluid. When top member 200 extends into bore 120 of the liquid charged FIG. 2 fluid system of functional block 620 as a result of an impact force, liquid fluid pressure medium is caused to be communicated to reservoir 642 and urged against the elastic diaphragm 644. Stretching of the diaphragm in response thereto enlarges the volume of reservoir 642, and hence the volume of the fluid softening system 610 containing the liquid fluid pressure medium. The cooperation of pressure chamber 300 and reservoir 642 in this way softens the liquid charged FIG. 2 fluid system of functional block 620.

It will be appreciated that in such a fluid softening system 610 an enclosed reservoir with no elastic sidewall can be used in place of the elastic-sidewalled reservoir above described. In such a non-elastic walled reservoir, the reservoir can be provided with impact force modulating means—for example, a gaseous charged fluid bag secured inside the reservoir away from the reservoir opening to the channel member—which modulates the forces imparted to the top member that are communicated to the reservoir by fluid pressure medium through channel member 632. Alternatively, if the FIG. 2 system is charged with a gaseous fluid pressure medium, the fluid bag in the reservoir can be charged with a liquid fluid pressure medium.

It will also be appreciated that in these and other reservoir-interfaced FIG. 2 force modulating systems 610 (including such systems where the reservoir is not remotely located from the pressure chamber), the rebound of the top member can be controlled by providing along the flow line between the pressure chamber and the reservoir one or more valves capable of controlling the movement of the fluid pressure medium within the system 610. Such valves can be calibrated to cause a certain resistance to the passage of fluid pressure medium.

As one example in a two channel member 632 system 610, the first channel can be provided with a first one-way valve substantially allowing only flow from the pressure chamber to the reservoir at a first resistance and the second channel can be provided with a second one-way valve substantially allowing only flow from the reservoir to the pressure chamber at a second resistance that is less than the resistance of the first valve. This two valve system provides for greater resistance on compression strokes of the core assembly than on rebound strokes. As one example in a one channel member 632 system, a ball type valve can be oriented within channel member 632 so as to provide more resistance on compression than on rebound. In this example, a free ball valve is fitted within the channel member 632, the ball being free to move axially within the valve body. The valve is fitted into the channel (in this illustration the channel runs lengthwise with respect to the ski and terminates behind the FIG. 2 fluid system) so that the downstream seat terminates away from and the upstream seat terminates toward the pressure chamber of the FIG. 2 fluid system. With the skis facing downhill, gravity forces the ball against the upstream seat, the open position of the valve, which allows minimally restricted flow of fluid pressure medium through the channel member. A pressure differential across the valve created by the plunging of the top member (of the FIG. 2 fluid system) into the pressure chamber forces the ball into the substantially closed position against the downstream seat which is configured so that in this position the valve allows some but very little flow of fluid pressure medium through the channel member.

In a second "fluid softening" system 610 accomplished through parametric changes being made to the fluid pressure means, the FIG. 2 fluid system represented by functional block 620 of FIG. 6 is charged here with a gaseous fluid pressure medium (although it will be appreciated that such a system 610 can be adapted to lend itself to charging with a liquid fluid pressure medium), functional block 630 again comprises channel member 632 and functional block 640 here comprises a valve control system with transducer feedback 700. As shown in FIG. 7, the control system 700 comprises an electronic control valve 710, reservoir 720, first and second plumbing flow lines 730, 732, control circuit 740, transducer circuit 750 and power source 760.

As shown in FIGS. 7,8, valve 710 comprises a solenoid operated microminiature valve having low power and small space requirements. For ski climates at or above about the freezing point temperature, illustratively, a 1¼"X½", 1.5 watt, 12 volt, 0–50 psi, 2-way normally closed sub-miniature solenoid valve with 0.03 orifice manufactured by Asco/Angar is used. Illustratively, the valve is mounted on a nonmovable member of the ski device behind binding unit. Reservoir 720 is a rectangular 10 cc metallic container for receiving and holding fluid pressure medium. A manual bleed port 722 is provided at a lower end thereof to permit bleeding of fluid pressure medium from the reservoir. Illustratively, the reservoir is mounted on a nonmovable member of the ski in close proximity to the valve. The reservoir is connected to the valve by first plumbing flow line 730. The second plumbing flow line 732 connects the valve to an open end 634 of the channel member 632 along the surface of the ski.

Transducer circuit 750 comprises an immersion type temperature transducer 752 and a signal conditioning circuit 754. The transducer is immersed into the fluid pressure medium of the pressure chamber of the FIG. 2 fluid system represented by functional block 620 through housing 110 where the sensor is mounted through a pressure sealed opening. Illustratively, a threaded mounting allows for compression sealing by means of a gasket or O ring between the housing and the mounting boss. Wire means 756 from the transducer are run through bottom member of the ski device and are brought out of the bottom member behind function block 620 so as to terminate near the valve 710 and the reservoir 720 at the signal conditioning circuit 754. Signal conditioning circuit comprises a voltage follower circuit which has an output voltage that follows the input voltage. It receives the instantaneous signal from temperature transducer 752 and generates an amplified, filtered signal at its output. By isolation of the transducer from the load at comparator 742, as hereinafter described, the conditioning circuit prevents undesired interactions or loading effects between the transducer and the load.

Control circuit 740 comprises a comparator circuit 742, a monostable multivibrator 744, and a power amplifier 746. Comparator 742 is an inverting level detector which compares the instantaneous signal from signal conditioning circuit 754 with a reference signal. The reference signal is set to the voltage level generated by the transducer circuit 750 at the critical temperature, as hereinafter described. Whenever the input signal to the comparator changes from less than the reference to greater than the reference (or vice-versa), the output of the comparator abruptly changes state. The output from the comparator, logic high after reset, is applied to the monostable multivibrator 744. The monostable multivibrator is a monostable multivibrator circuit which in response to a negative trigger pulse from the comparator 742 generates a voltage pulse with a width having a predetermined time, illustratively, 3 seconds. Power amplifier 746 comprises a power amplifier circuit. It receives the signal from the monostable multivibrator and generates a power amplified signal at its output. The output from the power amplifier drives the valve.

Power source 760 comprises a power pack 762 and a voltage regulator 764. Power pack 762 generates electrical energy for powering control circuit 740, transducer circuit 750 and valve 710. Illustratively, power pack comprises a 12 volt source comprising a series connection of 1.5 volt alkaline-manganese dioxide cell systems. Alternatively, other cell systems mountable on the ski and meeting the power requirements of the control circuit, the transducer circuit and the valve can be used. Power amplifier 746 is powered directly off power pack 762. The voltage level put out by the power pack is stepped down through voltage regulator 764 for powering transducer circuit 750, comparator 742 and monostable multivibrator 744.

Signal conditioning circuit 754, control circuit 740, and voltage regulator 764 are mounted on a substrate 770 of electrically insulated material such as a plastic. The power amplifier 746 and voltage regulator 764 are mounted to the substrate 770 through metal heat fins 772,773, respectively, which serve to dissipate heat generated by these devices. Substrate 770, power pack 762, valve 710 and reservoir 720 are mounted to a bottom panel 782 of a housing 780 which in turn is preferably mounted on a nonmovable member of the ski. The housing is preferably made from hard plastic so as to withstand impacts experienced during skiing and to insulate the components contained inside the housing from the environment. Alternatively, any material or combination of materials that meet the above impact and electrical requirements can be used. The housing is provided with a lid member 783 which can be opened, allowing the electrical elements inside the housing to be reached from outside of the housing but which, when closed, provides complete electrical insulation and insulation of the elements from the environment. Hinges 784, 786 on the lid member 783 allow housing 780 to be so opened. The housing is configured so as to allow adequate heat dissipation of the elements internal to the housing that are mounted to the bottom panel 782 of the housing. A snap member 787 on lid 783 mates with a catch member 788 provided on the bottom panel 782 of the housing when the lid member is in the closed position so as to keep the lid of the housing snap-tight closed when the ski device is stored or in use. All electrical leads are shrink wrapped with plastic tubing and terminal connections are electrically insulated from the environment.

In this system, gaseous fluid pressure medium in the FIG. 2 pressure chamber represented by function block 620 is hardened by heat produced by the plunging action of the FIG. 2 top member in the pressure chamber. When the temperature of the gaseous fluid pressure medium in the pressure chamber reaches the critical temperature, as hereinafter described, the valve 710 is actuated so as to allow the gaseous fluid pressure medium to communicate with the reservoir 720. Slight decompression of the pressure chamber caused by the fluid pressure medium now occupying the combined larger volume of the reservoir and the pressure chamber causes the gaseous fluid pressure medium in the pressure chamber to soften, resulting in a softer ski.

Control of gas flow out of the pressure chamber is realized by the valve 710. Without excitation of the valve, the valve is closed, thus preventing gaseous fluid pressure medium in the pressure chamber from flowing into the reservoir, but permitting gaseous fluid pressure medium already in the reservoir to be vented off through bleed port 722. Activation of the control valve by an electrical signal from the control circuit 740 permits gaseous fluid pressure medium to flow into the reservoir and cause the pressure level in the pressure chamber to relax. (It will be appreciated that instead of venting fluid pressure medium into the reservoir, such system can be adapted to vent the fluid pressure medium into the atmosphere.)

The critical temperature in the control system is predetermined as the temperature at which the response characteristics of the fluid pressure medium are deemed advantageous to be changed. Illustratively, in a system having a working volume up to the valve of about 90 cc (with a volume after the valve and including reservoir 720 of about 10 cc) fabricated so as to be chargeable to 30 psi operating in about a zero degrees Centigrade climate, activation of the valve 710 at a critical temperature of about 27.5 degrees Centigrade softens the pressure of the fluid pressure medium from about 33 psi at the critical temperature to under about 30 psi.

In the illustrative embodiment of the present invention shown in FIG. 2, bottom member 100 defines in a portion thereof housing 110 forming bore 120 on an inside surface and top member 200 comprises the core assembly 210 slidably disposed within the bore 120 and the top layer 260 engageable with the core assembly 210. Alternatively and as shown in FIG. 9, in ski device 1010, a bottom member 1100 is fabricated so as to serve as the top portion of the ski device and a top member 1200 is fabricated so as to serve as the bottom portion of the ski. Ski device 1010 comprises many of the same elements as that of FIG. 2 and such elements bear the same numbers, increased by 1000. In this illustration, the top member 1200 now serving as the bottom surface is not provided with a protective cosmetic surface layer as in FIG. 2 but instead further comprises a low friction running surface 1130 and edges 1140 and the bottom member 1100 now serving as the top surface is not provided with running surface and edges, but instead further comprises a protective cosmetic layer 1264.

In addition, although the top member of the ski device of the present invention has been described in terms of its providing a top or bottom surface to the ski device (see FIGS. 2,9, respectively, for example), it will be appreciated that in the present invention the exposed portions of the ski device lying above its running surface can be provided with an elastic case—made of rubber, for example—which prevents moisture, air flow, objects, and other elements external to the ski from penetrating the inner recesses of the ski device that are reachable by going between the top and bottom members of the ski device. Illustratively, such an elastic overlay, which illustratively is adhesively secured along its edges to the ski device, has sufficient elasticity to permit the top member to move with respect to the bottom member. In this embodiment, the top member is incorporated within the ski.

Moreover, it will be appreciated from FIG. 3, where housing 110 portion is fabricated separately from the bottom member and then bonded to the bottom member, that such separately fabricated housing can in fact serve as a body member of a force modulating device, for use in a ski device, in which the top member 200 serves as a movable member of the force modulating device, movably interconnected to the body member, and in which fluid pressure means, illustratively comprising fluid containment means and a fluid pressure medium, is disposed between the body member and the movable member of the force modulating device for floating the movable member with respect to the body member and controlling the relative movement between the movable member and the body member. Incorporated into the ski device, the controlled movement of the movable member relative to the body member provided by the fluid pressure means causes impact forces that are imparted to the force modulating device and hence ski device in which it is incorporated to be so modulated as to allow for good ski performance in terms of spring-action, smooth ride, handling, and service life.

It will be appreciated that such a force modulating device can be so incorporated into the ski device that its movable member provides a top or bottom component to the ski device—as in FIGS. 2,9, for example Or it can be so incorporated that its body component provides a top or bottom component to the ski device. Alternatively, the entire force modulating member of the present invention (i.e., both movable and body members), can be incorporated within the ski device. Incorporating into the ski device more than one such device of like or different fluid pressure means, with the sprung and unsprung portions of the device being "weighted" appropriately, can further tailor the dynamic response of the ski to particular impact forces.

It will be appreciated that there exist other varying permutations and combinations for dimensioning the force modulating device of the present invention. For example, although the depth of the top member has been illustrated as uniform therethrough, such depth can be made to vary along the surface of the ski device. Similarly, the depth of the bore can be made to vary along the length of the ski device. Other varying permutations and combinations for dimensioning of the top member and bore of the force modulating device can be used so as to provide a desired stiffness to the ski device.

It will also be appreciated that a fluid pressure supply source of small dimensions can be mounted on the ski device. The fluid pressure supply source can be interfaced to inlet port 310 so as to allow for manual, or as set forth below, automatically controlled, regular or periodic communication of fluid pressure medium from the fluid pressure supply source to the pressure chamber.

It will further be appreciated that the valve control system with transducer feedback 700 can employ any control means—limited only by the space requirements available on the ski and, if of an electrical type, the power requirements imposed by the power source useable on the ski. Such control means can, for example, monitor force, pressure, velocity, temperature and other physical parameters through sensing means located in the pressure chamber and elsewhere throughout the ski and can control the fluid pressure medium in response thereto. As one example, control means can control communication between an on-board fluid pressure supply source, automatically, allowing there to be irregular or periodic communication of fluid pressure medium from said source to the pressure chamber during a ski run. If more than one fluid pressure supply source is mounted to the ski, each at a different charge, on-board control means can, for example, allow there to be automatic irregular or periodic communication between one or more of such fluid pressure supply sources and the pressure chamber—or chambers, if more than one such force modulating device is used in the ski device—during a ski run based upon information the control means receives from on-board sensing means.

While the invention has been described in conjunction with specific embodiments, it is evident that numerous alternatives, modifications, and variations will be apparent to those skilled in the art within the spirit and scope of the invention described above.

I claim:

1. A ski body having a ground contacting bottom surface, said ski body comprising:
   a bottom member having an exposed top surface and a ground contacting bottom surface, said ground contacting bottom surface of said bottom member forming said ground contacting bottom surface of said ski body;
   a housing attached to said exposed top surface of said bottom member, said housing having an immovable top surface and side walls and defining a cavity having an opening along said immovable top surface, said immovable top surface and said side walls of said housing above the top surface of said bottom member, and that portion of said top surface of said bottom member surrounding the housing, together, forming an immovable top surface to said ski body;
   a movable member extending into said cavity, said movable member extending along a portion of said ski body occupied by the boot and binding of the skier, said movable member having a top surface which forms a movable top surface to said ski body;
   means adapted to said ski body for limiting the upward movement of said movable member;
   sealed compressible fluid under pressure disposed in said housing between said bottom member and said movable member for controlling the relative movement of said movable member with respect to said ski body.

2. The ski body according to claim 1 wherein said bottom member is an off the shelf ski body separately fabricated from said housing.

3. The ski body according to claim 1 wherein said side walls of said housing are shaped to fit into a window defined in the top surface of said bottom member, said window opening along a portion of said top surface of said bottom member occupied by the boot and the binding of the skier.

4. The ski body of claim 1 wherein said sealed compressible fluid is a gas.

5. The ski body of claim 1 wherein said sealed compressible fluid is a liquid.

6. The ski body of claim 1 wherein said sealed compressible fluid is a combination gas and liquid.

7. The ski body of claim 1 wherein said compressible fluid is sealed by the tight cooperation of said movable member with the wall of said cavity.

8. The ski body of claim 1 wherein said compressible fluid is sealed by a fluid bag contained within said cavity.

9. The ski body of claim 1 wherein said compressible fluid is sealed by a resilient seal disposed between said movable member and the wall of said cavity.

10. The ski body of claim 1 further comprising an inlet port opening at a first end to said cavity and at a second end along an outside surface of said ski body.

11. The ski body of claim 10 wherein said inlet port is a pressure valve.

12. The ski body of claim 8 further comprising an inlet port opening at a first end to the inside of said fluid bag and at a second end along an outside surface of said ski body.

13. The ski body of claim 12 wherein said inlet port is a pressure valve.

14. The ski body of claim 1 wherein said means for limiting the upward movement of said movable member is a stop provided on said movable member which is movably received by an outwardly stepped portion of said cavity.

15. The ski body of claim 14 wherein said stop is a sidewardly extending flange which is dimensionally smaller than said outwardly stepped portion and which extends sidewardly into said outwardly stepped portion so as to be longitudinally movable within said outwardly stepped portion.

16. The ski body of claim 1 further comprising structural enhancement means between said movable member and said housing for resisting said movable member for rolling, pitching, or yawing within said cavity during turning motions of said ski body. from rolling, pitching, or yawing within said cavity during turning motions of said ski body.

17. The ski body of claim 16 wherein said structural enhancement means is provided by the cooperation of said movable member with the wall of said cavity.

18. The ski body of claim 16 wherein said structural enhancement means is provided by providing said housing with at least one vertical guide post which extends longitudinally upward from a bottom surface of said cavity and into said cavity, and defining at least one longitudinal opening on a bottom surface of said movable member for movably receiving said vertical guide post.

19. The ski body of claim 1 wherein a layer of elastic material is disposed above said movable and immovable top surfaces of said ski body and said ground contacting bottom surface comprises a running surface layer disposed below said bottom surface of said bottom member.

20. The ski body of claim 1 wherein a first cosmetic top layer is disposed above said movable top surface of said ski body and a second cosmetic top layer is disposed above said immovable top surface of said ski body and said ground contacting bottom surface comprises a running surface layer disposed below said bottom surface of said bottom member.

21. The ski body of claim 1 wherein said sealed compressible fluid comprises a plurality of sealed compressible fluids.

22. The ski body of claim 2 wherein said sealed compressible fluid is a gas.

23. The ski body of claim 2 wherein said sealed compressible fluid is a liquid.

24. The ski body of claim 2 wherein said sealed compressible fluid is a combination gas and liquid.

25. The ski body of claim 2 wherein said compressible fluid is sealed by the tight cooperation of said movable member with the wall of said cavity.

26. The ski body of claim 2 wherein said compressible fluid is sealed by a fluid bag contained within said cavity.

27. The ski body of claim 2 wherein said compressible fluid is sealed by a resilient seal disposed between said movable member and the wall of said cavity.

28. The ski body of claim 2 further comprising an inlet port opening at a first end to said cavity and at a second end along an outside surface of said ski body.

29. The ski body of claim 28 wherein said inlet port is a pressure valve.

30. The ski body of claim 26 further comprising an inlet port opening at a first end to the inside of said fluid bag and at a second end along an outside surface of said ski body.

31. The ski body of claim 30 wherein said inlet port is a pressure valve.

32. The ski body of claim 2 wherein said means for limiting the upward movement of said movable member is a stop provided on said movable member which is movably received by an outwardly stepped portion of said cavity.

33. The ski body of claim 32 wherein said stop is a sidewardly extending flange which is dimensionally smaller than said outwardly stepped portion and which extends sidewardly into said outwardly stepped portion so as to be longitudinally movable within said outwardly stepped portion.

34. The ski body of claim 2 further comprising structural enhancement means between said movable member and said housing for resisting said movable member from rolling, pitching, or yawing within said cavity during turning motions of said ski body.

35. The ski body of claim 34 wherein said structural enhancement means is provided by the cooperation of said movable member with the wall of said cavity.

36. The ski body of claim 34 wherein said structural enhancement means is provided by providing said housing with at least one vertical guide post which extends longitudinally upward from a bottom surface of said cavity and into said cavity, and defining at least one longitudinal opening on a bottom surface of said movable member for movably receiving said vertical guide post.

37. The ski body of claim 2 wherein a layer of elastic material is disposed above said movable and immovable top surfaces of said ski body and said ground contacting bottom surface comprises a running surface layer disposed below said bottom surface of said ski body.

38. The ski body of claim 2 wherein a first cosmetic top layer is disposed above said movable top surface of said ski above said immovable top surface of said ski body and said ground contacting bottom surface comprises a running surface layer disposed below said bottom surface of said bottom member.

39. The ski body of claim 2 wherein said sealed compressible fluid comprises a plurality of sealed compressible fluids.

* * * * *